Figure 3:
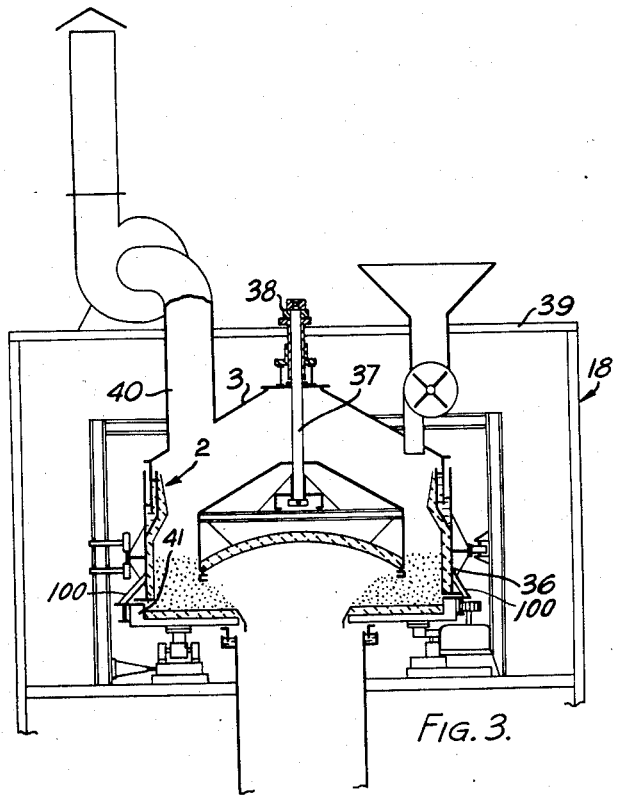

July 19, 1960 G. G. J. DAVIS 2,945,687
APPARATUS FOR THE MANUFACTURE OF PORTLAND
CEMENT, LIME AND THE LIKE
Filed May 14, 1957 7 Sheets-Sheet 1
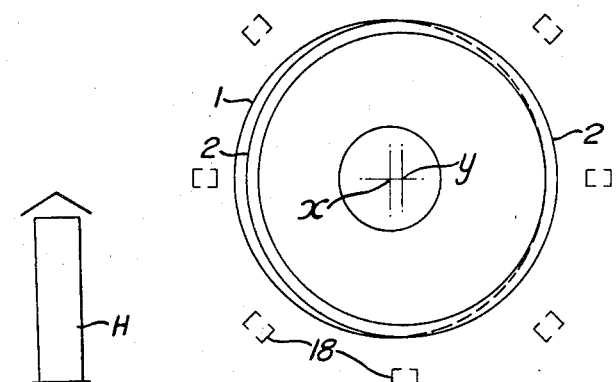
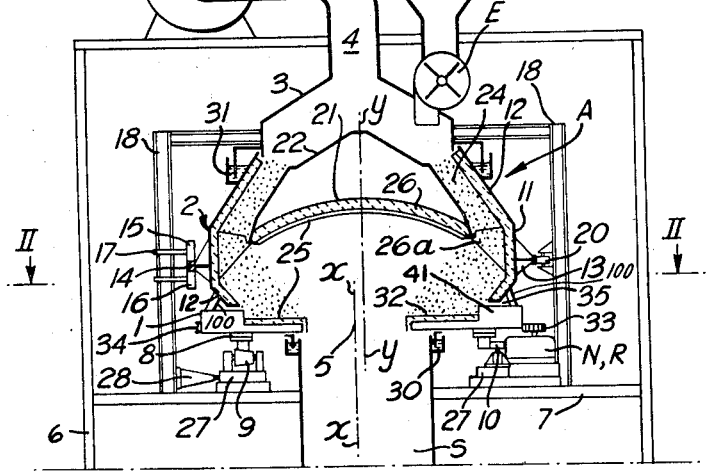
Inventor:
Geoffrey George John Davis
By his attorneys:
Baldwin & Wight

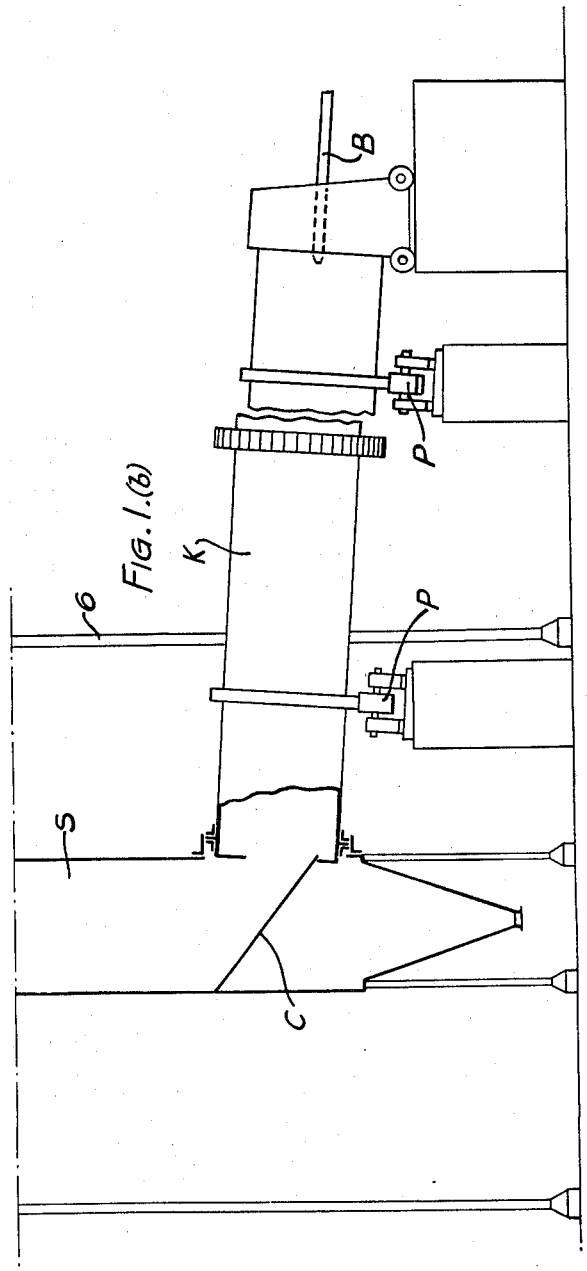

July 19, 1960

G. G. J. DAVIS 2,945,687

APPARATUS FOR THE MANUFACTURE OF PORTLAND
CEMENT, LIME AND THE LIKE

Filed May 14, 1957

7 Sheets-Sheet 3

Inventor:
Geoffrey George John Davis
By his attorneys:
Baldwin & Wight

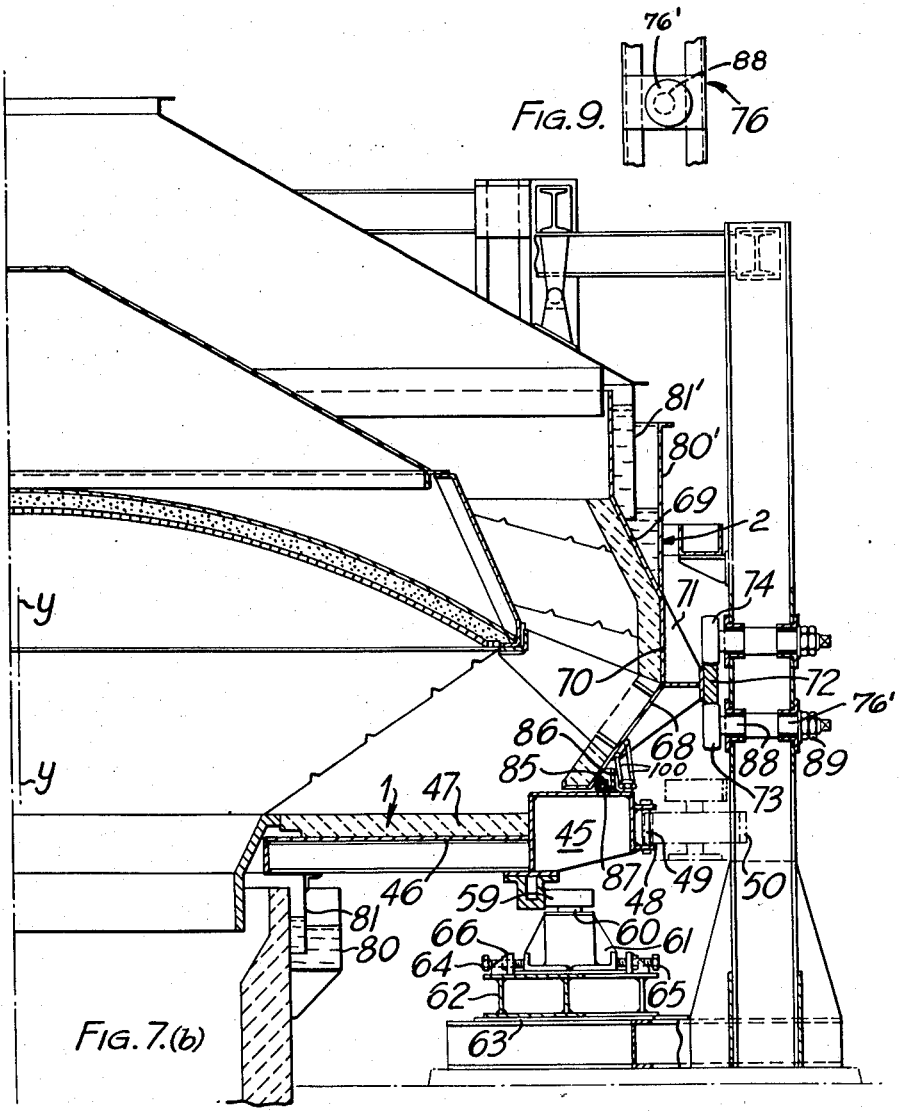

July 19, 1960

G. G. J. DAVIS 2,945,687

APPARATUS FOR THE MANUFACTURE OF PORTLAND
CEMENT, LIME AND THE LIKE

Filed May 14, 1957

7 Sheets-Sheet 6

Inventor:
Geoffrey George John Davis
By his attorneys:
Baldwin & Wight

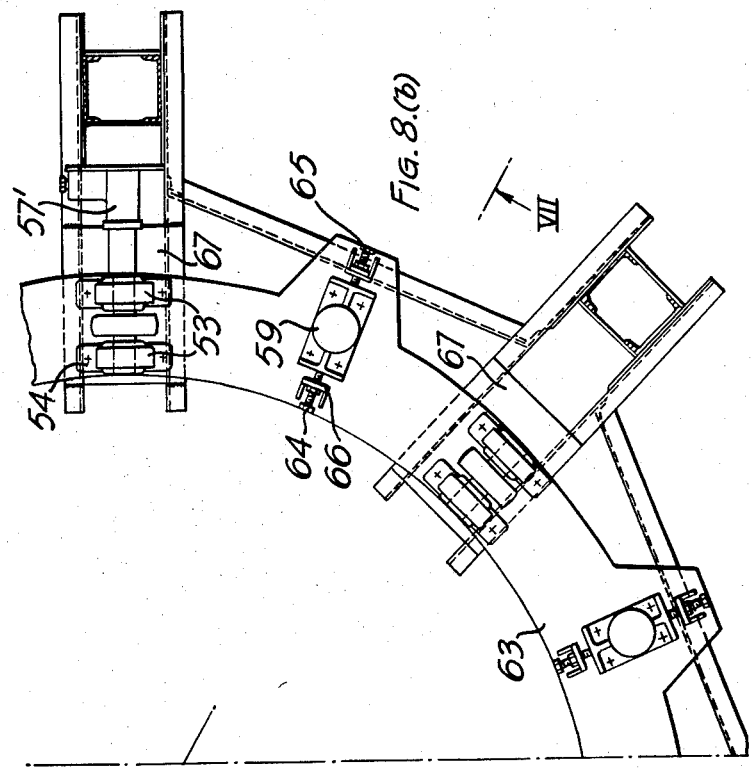

2,945,687

APPARATUS FOR THE MANUFACTURE OF PORTLAND CEMENT, LIME AND THE LIKE

Geoffrey George John Davis, Regents Park, London, England, assignor to The Associated Portland Cement Manufacturers Limited, London, England, a company of Great Britain Filed May 14, 1957, Ser. No. 659,142

Claims priority, application Great Britain May 16, 1956

10 Claims. (Cl. 263—32)

This invention relates to heat exchange apparatus suitable for the drying of raw materials in the manufacture of Portland cement clinker, lime and the like, and for the treatment of ores and minerals in which the materials have to be subjected to heat in a kiln.

More particularly the invention is concerned with the pre-treatment of raw materials for the manufacture of Portland cement clinker in a rotary kiln and with reference to which it is hereinafter described in detail.

In the manufacture of Portland cement the raw materials, calcareous and argillaceous minerals, are finely ground, proportioned and blended, after which they are heated to the point of incipient fusion, a temperature in the region of 1450° C., when chemical reaction occurs with the formation of new clinker minerals which form the basis of the cement.

Two methods are in normal use for the preparation of the raw materials; the "dry process," in which they are first dried then ground and blended in the dry state to form what is termed a dry raw meal, and the "wet process," in which the grinding takes place in the presence of water to form a slurry or suspension commonly containing about 40% of water. The subsequent heating and clinkering of the raw material can be along either the same or different lines for the wet and dry methods.

It is recognized that there are certain advantages in the wet process especially in the preparation, grinding and blending of the materials, particularly the soft materials such as chalk, marl, clay and the like.

However, the high water content of the resultant slurry, about 40% water, presents a material disadvantage because the amount of fuel which is required to dry the slurry is almost as great as that which is required for clinkering it.

The present invention is primarily concerned with a heat exchange apparatus for the pre-treatment of materials which are to be fed to a kiln and which may be used to advantage as a drier for the raw materials of Portland cement.

Previous forms of apparatus which have been suggested for this purpose and which, for the sake of economy, make use of the hot exhaust gases from the kiln have not been found altogether satisfactory in practice in view of the difficult nature of the raw material which is a sticky plastic mass. It will be appreciated that in order to operate the kiln at maximum efficiency it is important that the pre-drying apparatus can be relied upon to dry its contents uniformly and to discharge the material in continuous and controlled manner.

The apparatus of this invention is designed to receive the material in the form of nodules which in the case of cement are produced by admixture of dry raw meal with sufficient water to enable the meal to be rolled into nodular form, or alternatively from dewatered slurry, e.g. slurry filter cake.

The object of the present invention is to provide an improved means of discharge so that the discharge of material takes place evenly and progressively around the whole circumference of the discharge aperture in the hearth or base of the drying chamber.

According to the present invention the heat exchanger apparatus comprises a rotatable chamber body in two parts, an upper wall part or bowl, and a lower part or hearth, in which is a central opening for the discharge of dried material and for admission of the drying gases to the chamber, the two parts being so arranged that the vertical axes of the two parts are offset by a small distance, whereby due to the relative displacement of the two parts, as they rotate substantially in step, the material on the hearth will be caused to discharge through the opening in a manner which is continuous and uniform over the entire area of the hearth.

In one construction in accordance with the invention the two parts of the heat exchanger, i.e. the wall portion or bowl and the hearth, are separately supported on rollers and provision made for their independent rotation at approximately the same speed, an air seal being provided at the point of junction of the bowl and hearth. The supporting rollers for either the hearth or the bowl or both may be made vertically adjustable to permit of adjustment of the junction air seal between the hearth and bowl in the most favourable position, and also to avoid the transfer of load from the bowl to the hearth, which might otherwise set up excessive friction as the two parts move relative to each other.

The invention is illustrated in the accompanying drawings in which:

Figure 1ª is a diagrammatic vertical sectional view of a heat exchanger arranged to operate in conjunction with a rotary kiln and constructed in accordance with the invention, Figure 1ᵇ is a diagrammatic vertical sectional elevation of the rotary kiln associated with the heat exchanger shown in Figure 1ª, the dot-dash lines respectively at the bottom of Figure 1ª and the top of Figure 1ᵇ indicating junction of the apparatus shown in the two figures, Figure 2 is a transverse section on the line II—II of Figure 1ª.

Figure 4:
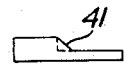
Figure 5:
Figure 6:
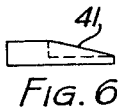
Figure 7:
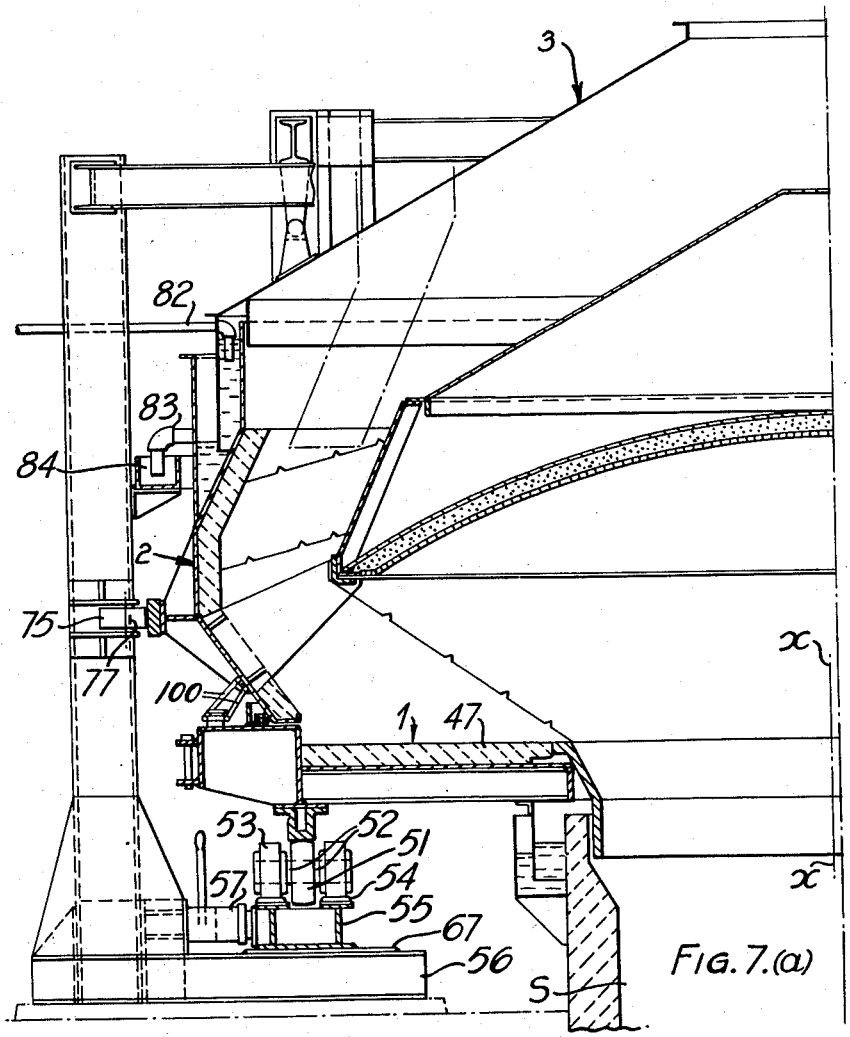
Figure 8:
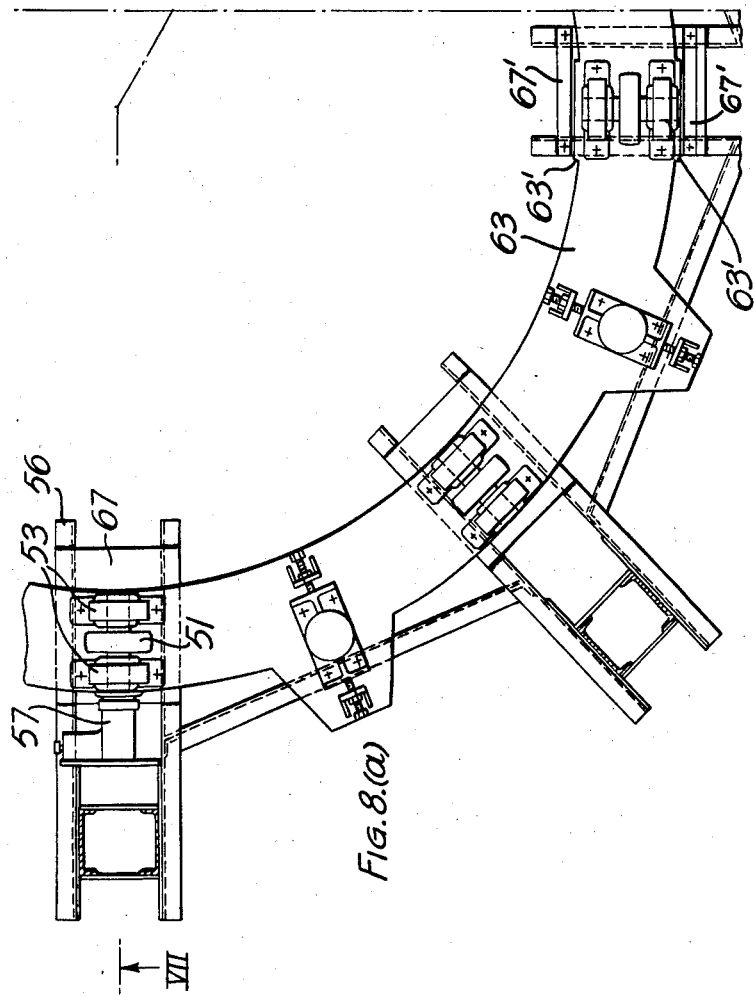

Figure 3 is a diagrammatic sectional view of an alternative construction of heat exchanger, Figures 4, 5 and 6 are detail sectional views showing alternative forms of construction for the hearth, Figure 7ª is a sectional elevation on an enlarged scale on the line VII—VII of Fig. 8ª of one half of the heat exchanger shown in Figure 1ª and including details of construction of the revolving hearth and its associated wall portion and the manner in which both the hearth and wall portion are mounted for rotation, Figure 7ᵇ is a sectional elevation of the other half of the heat exchanger shown in Figure 7ª, the dot-dash lines indicating the junction of the heat exchanger halves, Figure 8ª is a part plan view to show one part of the roller support track for the hearth, Figure 8ᵇ is a plan view showing an adjoining part of the roller support track, the dot-dash lines indicating junction of the parts shown in Figures 8ª and 8ᵇ, Figure 9 is a detail view, showing a method of adjustably mounting the rollers which support the bowl. The spindles on which the rollers are rotatably mounted are made eccentric so that by rotating the spindles the roller position can be adjusted so as to maintain the necessary clearance at the seal between bowl and hearth.

Referring to Figures 1ª, 1ᵇ of the drawings there is shown a rotary kiln K of conventional design mounted to revolve on support rollers P and fired at its lower end by fuel fed through a burner pipe B. The hot gases from the combustion of the fuel on passing out of the kiln enter a vertical shaft S which is connected at its upper end to a vertical annular heat exchanger indicated generally at A. Within the shaft S is a chute C so that solids from the heat exchanger on discharging into the chute, will be automatically fed into the rotary kiln.

The raw material, which may be in the form of nodules formed from slurry filter cake or from raw meal, is fed at the required rate through a chute D having a rotary airlock E which communicates with the upper section of the heat exchanger A.

The present invention is concerned with the construction and operation of the heat exchanger A and it is a feature of this invention that it comprises a chamber formed in two portions, a lower portion 1 constituting the hearth proper surmounted by a wall portion in the form of a bowl 2, enclosed at the top by a stationary roof portion 3, from which the drying gases are carried away through an off-take 4 leading to a chimney H, a fan F being provided in the offtake 4 to assist in the drawing off of the hot gases and their passage through the bed of raw material nodules within the hearth and bowl, as will hereinafter be described.

The hearth 1 is of annular construction so as to provide a central opening 5 for the discharge of the heated and dried raw material, through which it falls into the shaft S and thence on to the chute C before passing into the kiln K. Surrounding the kiln K at its upper end is a superstructure indicated generally at 6 and provided with a horizontal platform 7, within which the vertical shaft S is centrally supported. On the platform 7 and concentric with the opening 5 is a circular track provided by a series of rollers 9 which in the embodiment illustrated are of taper form, these rollers supporting the hearth 1, the latter having on its under-surface a steel tyre 8 for engagement with the rollers. In addition to the support rollers 9 there are provided a series of thrust rollers 10, these rollers engaging the outer perimeter of the tyre 8 and by means of which the hearth is maintained correctly centred with respect to its axis of rotation indicated by the line x—x.

The wall portion or bowl 2 has a vertical wall section 11 and oppositely tapered conical portions 12. Attached to the vertical portion 11 are outer wall brackets 13 mounting a support track 14 for engagement with upper and lower sets of rollers 15, 16 mounted to revolve on spindles 17 carried by inner frame uprights 18 on the platform 7.

In addition to the support rollers 15, 16 the drum 2 is maintained correctly centered by a series of thrust rollers 20, which rollers are carried by the uprights 18 of the inner frame.

It will be appreciated, therefore, that the wall portion or bowl 2 is maintained correctly centred with respect to its axis of rotation y—y, this axis being off-set in relation to the axis of rotation of the hearth x—x, as is clearly shown in Figure 2. Both the support rollers 9 and the thrust rollers 10 for the hearth 1 are conveniently mounted on a sub-frame 27 which can be adjusted laterally as a whole to position the axis of rotation of the hearth 1 relative to that of the bowl 2 by means of suitably placed jacks, one of which is indicated at 28 in Figure 1ª.

Provision may also be made for relative vertical adjustment of the bowl 2 and hearth 1, between the meeting surfaces of which is an air-seal (not shown). This adjustment is desirable to avoid any transfer of load from the bowl to the hearth which could cause excessive friction as the two parts move relatively to one another.

Within the bowl 2 is an inner baffle 21 forming part of a dome structure 22 so that between the structure 22 and the upper conical portion 12 of the bowl 2, is an annular passageway 24 and within which the heat exchange takes place between the rising hot gases from the kiln and the descending raw material.

The bowl 2 and the baffle 21 may be constructed of steel and lined on their working faces with a layer of refractory 25 and insulating material 26 in the form of a self-supporting arch.

The structure 22 may be supported on three or more brackets 26a which incorporate resilient or sliding expansion joint connections in order to allow of differential expansion between the latter and the bowl 2.

As can be seen from Figure 1ª, both the hearth 1 and bowl 2 are sealed at their points of junction respectively with the vertical shaft S and the stationary upper portion 3 by means of seals indicated respectively at 30 and 31, which seals may be of the normal rubbing contact, sand or the water-trough type.

In the embodiment illustrated drive is imparted to the hearth by means of an electric motor N, reduction gearing R, on the output shaft of which is a pinion 33 meshing with a toothed driving ring 34 on the perimeter of the hearth 1.

It will be appreciated, therefore, that the present invention provides a heat exchange chamber in two portions including a lower portion 1 forming the hearth proper with a central discharge opening and an upper wall portion 2, the two portions 1 and 2 being caused to rotate at approximately the same speed and having an air seal at the point of junction, as indicated generally at 35.

In operation the raw material which may be in the form of nodules is fed into the interior of the stationary part 3 of the heat exchanger through the chute 3 and rotary air lock E when it falls on to the conically inclined portion of the spreader dome 21 where it passes downwardly through the annular passageway 24 and gradually builds up on the upper face 32 of the rotary hearth 1 to form a closely packed bed of material on the hearth from which the material discharges through the central aperture. In operation the material is allowed to build up until it reaches a level about half way up the annular space 24 and is maintained at this level by the balanced input of material to and discharge of material from the heat exchanger.

Due to the feature that the hearth 1 and its associated wall portion 2 are mounted to rotate about centres x—x, y—y, which are relatively offset from one another, there will be a relative displacement of the floor 1 of the hearth to the wall portion 2 with the result that the material will be pushed off the hearth 1 over that section of the hearth which is opposite to the area of maximum eccentricity. Satisfactory results have been obtained wherein the two axes are offset by a small amount of the order of three inches.

Referring now to Figure 3 there is shown an alternative construction of heat exchanger wherein the wall portion of the chamber indicated at 36 is of cylindrical form and the central structure is supported from above by means of a vertical shaft 37 suspended in bearings 38 from a crossbar 39 of the superstructure 18, which arrangement entails the repositioning of the gas off-take 40 at a point adjacent the perimeter of the stationary portion 3.

In order to promote an effective discharging action from the heat exchanger the hearth is preferably made with a step, as indicated at 41 (Figures 1a and 3), on its upper surface, the distance measured between opposite sides of the step being approximately equal to the diameter of the inner rim at the bottom of the bowl 2, less twice the amount of offset between the vertical axes of the bowl and hearth. The height of this step may be between 1 and 6 inches but we have found that a depth of 3 inches is satisfactory in practice where the diameter across the bottom of the bowl is of the order of 18 feet.

Alternately the step may be sloped (Fig. 4) instead of vertical or again alternatively the central section of the hearth may be downwardly coned (Fig. 6) or dished (Fig. 5).

It will be clear that the rate of discharge from the heat exchanger is proportional to the offset distance between the vertical axes of the hearth 1 and bowl 2 and to the speed of rotation. The device may, therefore, be varied in rate of discharge either by so mounting the separate parts that the offset of the vertical axes can be varied while keeping the speed of rotation constant or by keeping the offset constant and varying the speed of rotation, or by both means in conjunction.

In the embodiment shown in Figures 7a, 7b, 8a, 8b and 9 the lower portion or hearth 1 comprises an outer ring of box section 45 having an inwardly extending step or platform 46 fitted with a surface covering of refractory 47. Attached to the vertical wall of the outer ring 45 are flanges 48 mounting pins 49 which operate as a circular rack, with which meshes a toothed wheel 50 fast on the output shaft of the reduction gear box R through which drive is transmitted from the motor N. The support rollers 51 for the hearth 1 are fast on radially extending spindles 52 which are mounted to rotate in bearings 53 carried by pairs of brackets 54, each fast on a seating 55.

The individual seatings 55, which coincide with a series of radially arranged platforms 56 form part of an annular bed plate 63, the bed plate being bodily movable with the support roller seatings 55 on guide plates 67. Cooperating with two diametrically opposed seatings 55 are hydraulic jacks 57, 57', so that the position of the bed plate 63 and thus of the support rollers 51 can be adjusted laterally as required.

Should it be necessary to increase or decrease the relative displacement of the hearth 1 and bowl 2 this is effected by the jacks 57, 57'. In the position shown in Fig. 8a it will be seen that the left-hand jack 57 is retracted and the bed plate 63 is at approximately maximum displacement. At a point midway between the platforms 56 carrying the jacks 57 and 57', the bed plate has flats 63' for engagement with guideways 67' on the associated guide plate 67.

Thrust rollers 59 are mounted to rotate about vertical axes, being rotatably carried on stub axles 60 which are secured in pedestal mountings 61, the latter being slidably supported on platforms 62 carried by the annular bed plate 63. Adjustment of the mountings 61 is by means of set-screws 64, 65 in threaded engagement with inner and outer right-angled brackets 66. Any necessary re-adjustment of the thrust rollers 59 with the hearth can thus be readily effected by the set-screws 64, 65.

The wall portion associated with the hearth may consist of a bowl having lower and upper inwardly inclined conical sections 68, 69 extending from a vertical wall portion 70. Attached to the vertical portion 70 of the bowl are a series of fin-shaped bracket plates 71, to which is secured a track rail 72. Engaging opposite sides of the rail 72 are vertically spaced support rollers 73, 74.

Thrust rollers 75 are provided for engagement with the outer face of the rail 72. These rollers 75 may also be mounted on eccentrically adjustable axes 77, thus facilitating the adjustment of running clearances between the bowl 2 and anyone of the rollers should this be found necessary.

Provision is made for adjustment of both sets of rollers 73, 74 in an upwards or downwards direction so that the bowl 2 may be raised or lowered in relation to the hearth 1. In the arrangement shown the rollers revolve about spindles 88 and each spindle is capable of individual adjustments by means of a cam actuating fixing diagrammatically shown at 76 in Fig. 9 and so arranged that by slacking off the lock nuts 89 the cam fixing can be rotated by a tommy bar to move the spindle 88 up or down. The cam fixing shown in Figure 9 comprises a cam disc 76' journalled to rotate in a bearing provided in a bracket plate attached to the uprights of the superstructure. The cam disc 76' is fast on spindle 88 and since the centres of the spindle and cam are eccentric to one another, on turning the spindle, the position of the latter can be adjusted to raise or lower it as required.

Alternatively the spindles may be journalled in block type bearings and the bearing blocks which are slidably carried in vertical guides in the uprights 18 raised and lowered by screw jacks.

The water seal connection between the shaft S leading from the kiln K and the base part or hearth 1 is provided by means of an annular trough provided by means of a flange 80 on the outside wall of the shaft S and within which depends a flange 81 attached to the underside of the platform 46 of the hearth. The water-seal between the stationary portion 3 of the heat exchanger and the bowl 2 is provided by means of a similar wall extension 80' on the bowl and cooperating with which is a depending flange 81'. Water is supplied to the water-seal 80', 81' by means of a feed pipe 82 and drainage is by means of an outlet pipe 83 leading into a drain channel 84.

It will be seen that close contact between the lower face of the conical portion 68 of the drum or bowl 2 and the platform 45 of the hearth proper can be maintained by suitable adjustment of the support rollers 73, 74 to raise or lower the bowl and any tendency for escape of the gases can be prevented by means of a suitable gland device. For this purpose the bowl 2 is provided with a horizontal flange plate 85 and partly enclosed by an upstanding flange 86 on the platform 45. 87 indicates asbestos sealing rings.

It is desirable to couple the bowl and the hearth by a number of pivoted or flexible links to ensure that the two portions rotate in step and without cumulative slip. Flexible links for mechanically coupling the bowl or chamber part 2 and the hearth part 1 for this purpose are shown at 100 in Figures 1ª, 3, 7ª, and 7b.

What is claimed is:

1. Heat treatment apparatus comprising a treatment chamber part having openings at the top and bottom thereof respectively to permit throughflow of gas, feed means located above said chamber part, for charging material into the top of said chamber part, a substantially flat base part below said chamber part providing a hearth adapted to receive material from said bottom opening in the chamber part so that said material may build up on the hearth in the form of a bed, a discharge outlet for treated material positioned to receive material discharged from said hearth and communicating with the bottom opening in said chamber part so as to provide an inlet for gas into said chamber part, exhaust means connected to said opening in the top of the chamber part for removal of exhaust gas therefrom, means mounting said chamber part and means mounting said base part for independent relatively eccentric rotation about horizontally spaced vertical axes, means for rotating one of said parts, and means mechanically coupling said chamber part and said base part for rotating the other of said parts conjointly with and at substantially the same rate as said one of said parts, whereby material is discharged from said hearth into said discharge outlet upon rotation of said chamber part and base part by relative displacement of said chamber part and said base part in the radial direction, said discharge taking place in a uniform manner from all points on a perimeter of the hearth.

2. Apparatus according to claim 1, comprising means for adjusting the degree of offset between the axes of rotation of the chamber part and hearth whereby the relative displacement between said chamber part and hearth upon rotation thereof, and therefore the rate of discharge of material from the hearth is variable.

3. Apparatus according to claim 1, comprising means for adjusting the position of the chamber part in the vertical direction to enable said chamber part to be raised or lowered in relation to the hearth.

4. Apparatus according to claim 1, comprising a support on said hearth, support rollers journalled to rotate about substantially horizontal axes and being engageable by said support roller track for supporting said hearth, a thrust roller track on said hearth, a sub-frame, brackets mounted on said sub-frame for horizontal adjustment, thrust rollers journalled on said brackets for rotation about vertical axes and being engageable with said thrust roller track, horizontal shifting adjustment of said brackets displacing the hearth relatively to the chamber part, and means operatively associated with said brackets for effecting said shift of said brackets and thrust rollers.

5. Apparatus according to claim 4, comprising a chamber part support roller track on said chamber part, support rollers engageable with said chamber part support roller track, and means including eccentric means mounting the support rollers for the chamber part whereby said support rollers may be shifted vertically to raise or lower said chamber part in relation to the hearth.

6. Heat treatment apparatus comprising an annular treatment chamber part having openings at the top and bottom thereof respectively to permit throughflow of gas, feed means located above said chamber part for charging material into the top of said chamber part, an annular base part below said chamber part, said base part being of downwardly stepped formation in an inward radial direction and providing a hearth adapted to receive material from said bottom opening in the chamber part so that said material may build up on the hearth in the form of a bed, a central discharge outlet for treated material positioned to receive material discharged from said hearth across the inner rim portion thereof and communicating with the bottom opening in said chamber part so as to provide an inlet for gas into said chamber part, exhaust means connected to said opening in the top of the chamber part for removal of exhaust gas therefrom, means mounting said chamber and means mounting said base part for relatively eccentric independent rotation about horizontally spaced vertical axes, means for rotating one of said parts, and means mechanically coupling said chamber part and said base for rotating the other of said parts conjointly with and at substantially the same rate as said one of said parts, whereby material is discharged from said hearth into said discharge outlet upon rotation of said chamber part and hearth by relative displacement of the parts in the radial direction, said discharge taking place in a uniform manner from all points on a perimeter of the hearth.

7. Apparatus according to claim 6, in which the distance between two opposite points of the shoulder formed by the step formation of the base part is approximately equal to the internal diameter of the wall part where it contacts the base part, less twice the amount of offset of the axes respectively of the base and wall parts.

8. Heat treatment apparatus comprising a treatment chamber part having openings at the top and bottom thereof respectively to permit throughflow of gas and having side walls, feed means located above said chamber part for charging said material into the top of said chamber part, a hearth part separated from said chamber part and positioned below said chamber part for receiving said material from said opening in the bottom thereof, sealing means making gas-tight connection between said chamber part and said hearth part, an inlet for gas communicating with said opening in the bottom of the chamber part, exhaust means connected to said opening in the top of the chamber part for removal of exhaust gas therefrom, means mounting said chamber part and means mounting said hearth part for relatively eccentric rotation about horizontally spaced vertical axes, said chamber part being arranged relatively to the hearth part whereby upon rotation of said chamber and hearth parts about their axes at substantially the same speed, radial displacement of one side wall of said chamber part occurs relatively to the hearth part thereby to discharge material from said hearth, means for rotating one of said parts, and means mechanically coupling said chamber part and said hearth part for rotating the other of said parts conjointly with and at substantially the same rate as said one of said parts.

9. Apparatus according to claim 8, in combination with a rotary kiln for the manufacture of Portland cement and the like and comprising a vertical shaft arranged beneath the opening in the hearth part, the shaft at its lower end being connected to the inlet end of the kiln so that the hot gases from the kiln and the dried material from the heat exchange apparatus pass in counterflow through the shaft.

10. The combination according to claim 9, in which the horizontal distance between said spaced vertical axes is substantially in the direction of the length of said kiln and the chamber part axis is closer to said kiln than the hearth part axis, whereby the maximum relative displacement of chamber part and hearth part occurs at that part of the shaft most remote from the inlet of material to the kiln.

References Cited in the file of this patent

UNITED STATES PATENTS

| | | |
|---|---|---|
| 933,804 | Weideneder | Sept. 14, 1909 |
| 1,406,637 | George | Feb. 14, 1922 |
| 1,429,925 | Candlot | Sept. 26, 1922 |
| 2,505,249 | Johnson et al. | Apr. 25, 1950 |
| 2,520,384 | Davis | Aug. 29, 1950 |
| 2,799,489 | Rusche | July 16, 1957 |
| 2,863,654 | Beal et al. | Dec. 9, 1958 |